United States Patent [19]
Lee et al.

[11] Patent Number: 5,584,919
[45] Date of Patent: Dec. 17, 1996

[54] PELLETIZED PRE-DOPE GRANULES OF CELLULOSE AND TERTIARY AMINE OXIDE, SPINNING SOLUTION, OF CELLULOSE AND PROCESS FOR MAKING THEM

[75] Inventors: Wha S. Lee; Seong M. Jo; Ho J. Kang; Dong B. Kim; Chong S. Park, all of Seoul, Rep. of Korea

[73] Assignee: Korea Institute of Science and Technology, Seoul, Rep. of Korea

[21] Appl. No.: 302,017

[22] Filed: Sep. 9, 1994

[30] Foreign Application Priority Data

Sep. 9, 1993 [KR] Rep. of Korea .................. 93-18081

[51] Int. Cl.$^6$ .................................. C08L 1/02; C08L 1/24
[52] U.S. Cl. .................. 264/186; 106/200.2; 106/200.3
[58] Field of Search ........................... 106/165, 168, 106/176, 186, 203

[56] References Cited

U.S. PATENT DOCUMENTS

| | | |
|---|---|---|
| 2,179,181 | 11/1939 | Graenacher et al. . |
| 3,447,939 | 6/1969 | Johnson . |
| 3,508,941 | 4/1970 | Johnson . |
| 4,142,913 | 3/1979 | McCorsley, III et al. . |
| 4,144,080 | 3/1979 | McCorsley, III . |
| 4,196,282 | 4/1980 | Franks et al. . |
| 4,211,574 | 7/1980 | McCorsley, III et al. . |
| 4,246,221 | 1/1981 | McCorsley, III . |
| 4,290,815 | 9/1981 | Henry . |
| 4,324,539 | 4/1982 | Hanson . |
| 4,416,698 | 9/1983 | McCorsley, III ................ 106/163.1 |
| 5,094,690 | 3/1992 | Zikeli et al. ....................... 106/186 |
| 5,330,567 | 7/1994 | Zikeli et al. ....................... 106/176 |
| 5,413,631 | 5/1995 | Gray et al. ........................ 106/203 |

FOREIGN PATENT DOCUMENTS 0356419  2/1990  European Pat. Off. .

Primary Examiner—David Brunsman
Attorney, Agent, or Firm—Oblon, Spivak, McClelland, Maier & Neustadt, P.C.

[57]  ABSTRACT

This specification discloses pelletized pre-dope granules of cellulose and a tertiary amine oxide wherein the tertiary amine oxide is homogeneously dispersed throughout the cellulose and a process for making them. According to the invention, the pelletized pre-dope granules can be prepared by a process comprising of the steps of feeding cellulose to a mill with knife-edged blades, together with the tertiary amine oxide powder having a water content of 5 to 17% by weight; and milling and blending the resulting solid mixture in the blender, while heating the solid mixture at a temperature sufficient to agglomerate as a result of instantaneous melting of tertiary amine oxide powder and simultaneous penetration of the molten amine oxide into cellulose without dissolving the cellulose. The pre-dope granules thus obtained can be used in making shaped cellulosic articles such as fibers and films. According to the invention, the shaped cellulosic articles can be produced from the process comprising the steps of heating the pre-dope granules in the barrel of an extruder to give a dope solution, extruding the resulting dope solution to provide an extrudate to be spun, and spinning the extrudate through a spinnerette or die.

7 Claims, 3 Drawing Sheets

PELLETIZED PRE-DOPE GRANULES OF CELLULOSE AND TERTIARY AMINE OXIDE, SPINNING SOLUTION, OF CELLULOSE AND PROCESS FOR MAKING THEM

BACKGROUND OF THE INVENTION

1. Field of the Invention

The present invention relates to pelletized pre-dope granules of cellulose and a tertiary amine oxide wherein the tertiary amine oxide is homogeneously dispersed in the cellulose to penetrate therethrough, and a process for making them. Also, the present invention relates to a process for making a dope solution of cellulose adapted to be spun into cellulosic articles such as fibers and films.

2. Description of the Prior Art

A process for making cellulosic fibers using a tertiary amine oxide has greater advantages than the conventional processes using a viscose solution because the tertiary amine oxide is a non-polluting solvent. The process using a tertiary amine oxide can provide a clean environment for workers and substantially reduce the amount of waste water and atmospheric pollution which may occur in the course of producing fibers. Further, the viscose process is very complicated and requires high energy consumption, whereas the tertiary amine oxide is completely recovered. Thus, the latter process is more economical than the former one in view of the production cost. Moreover, the fibers obtained by the latter process are superior to those obtained from viscose rayon in view of their physical properties such as tensile strength. Thus, the latter fibers can be used as synthetic fibers with various advantages.

A process for making shaped cellulosic fibers from the cellulose solution in a tertiary amine oxide solvent was first proposed by Graenacher et al. in U.S. Pat. No. 2,179,181 issued in 1939. In accordance with the proposed process, from 7 to 10% by weight of cellulose is dissolved in the tertiary amine oxide solvent.

Since then, a number of methods have been proposed to develop a more effective and economical process for making cellulosic fibers. Most of them were focused on the production of a solution with a high solid content and the elimination of the problems of low workability due mainly to a high concentration of the solution. For example, a process using a N-methylmorpholine-N-oxide solvent as disclosed in U.S. Pat. No. 3,447,939 to Johnson, a process using a dimethyl sulfoxide, N-methyl-pyrrolidone, or sulfolane diluent for the solution in U.S. Pat. No. 3,508,941 to Johnson, and processes using amines as a co-solvent in U.S. Pat. Nos. 4,290,815 to Henry and 4,324,539 to Vargar, have been proposed.

Processes for producing a solution having a high solid content of cellulose in an amine oxide containing an appropriate amount of water are disclosed in U.S. Pat. Nos. 4,142,913 to McCorsley et al.; 4,144,080 to McCorsley; 4,196,282 to Franks et al.; and 4,246,221 to McCorsley. However, since the solution according to the above patents has too high viscosity to be wet-spun, these patents employ an air-gap spinning technique for increasing the production yields.

In accordance with the processes disclosed in these patents, cellulose is added to a solution of a tertiary amine oxide containing 50% or more excess of water to form a slurry by swelling, and then an excess of water contained in the slurry is distilled off under reduced pressure to form a cellulose solution for spinning. The resulting solution is supplied to an extruder equipped with a spinnerette. However, these processes necessarily require a long time for the distillation under reduced pressure. This causes thermal decomposition of cellulose and consequently discoloration of the spinning solution with reduction of molecular weight. Moreover, the resulting solution has a disadvantage that it causes deterioration of some physical properties after spinning.

U.S. Pat. Nos. 4,142,913 to McCorsley et al., and 4,144,080 to McCorsley disclose an azeotropic distillation process in which a non-solvent such as, for example, alcohols, dimethylformamide, dimethylsulfoxide, toluene, and xylene is added in order to more easily remove the excess of water. However, since a large amount of the non-solvent materials contained in the removed water must be recovered for reuse, these processes have a drawback that an additional, complicated step is required to separate the non-solvent materials from water. In addition, in the course of concentrating the cellulose solution, the concentration temperature and time will be raised and extended with the increment of the cellulose concentration, and more energy will be required to stir the slurry which will have higher viscosity. Thus, it is difficult to carry out a continuous process and results in low productivity.

U.S. Pat. No. 4,211,574 to McCorsley et al. discloses a process for making a cellulose solution wherein a pulp sheet of cellulose is soaked in a liquid tertiary amine oxide having a water content of 5 to 15% cellulose at 89° to 95° C. to be swollen, and then the mixture is stirred and heated without concentration. This process has the advantage that a cellulose solution having a high solid content can be produced within a short period of time without concentration. However, since the liquid phase of amine oxide may swell the cellulose concurrently with the dissolution of the cellulose, it is may be likely to form a coating on the surface of pulp which is not yet dissolved. This makes a deep penetration of the amine oxide into the pulp impossible. Thus, this process has the drawback that, in spite of strong stirring or heating of the solution, a homogeneous solution cannot be formed due to the presence of undissolved cellulose.

European Patent No. 356,419 to Stefan et al. suggests a continuous process for making a large amount of cellulose solution within a short period of time by means of the same concentration steps as those of the above processes. According to this process, the cellulose slurry having a weight average polymerization degree of 1,400, which is obtained by swelling the cellulose solution in a tertiary anine oxide containing 40% by weight of water, is transferred to an extruder fitted with a screw having a fan type screw path, and distilled under reduced pressure with the retention time of 3 minutes in the extruder to form a cellulose solution at the rate of 72 kg per hour. In this process, the fan type screw is used for transferring the slurry concurrently with its concentration. Thus, this process has the problem of high production cost due to the energy for operating the screw.

Various processes for producing a cellulose solution in a tertiary amine oxide suggested in all the prior art patents as mentioned above may be categorized into two groups as follows:

Group I: Processes as disclosed in U.S. Pat. Nos. 4,142,913, 4,144,080, 4,196,282, 4,246,221, 4,290,815, and European Patent No. 356,419.

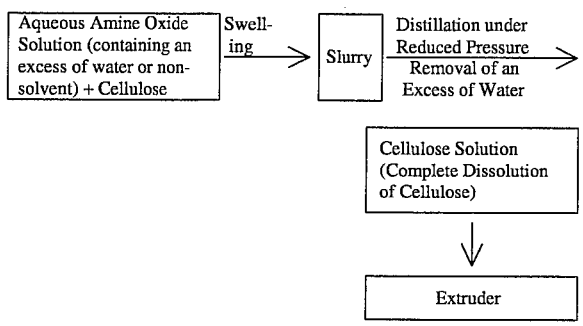

Group II: Process as disclosed in U.S. Pat. No. 4,211,574.

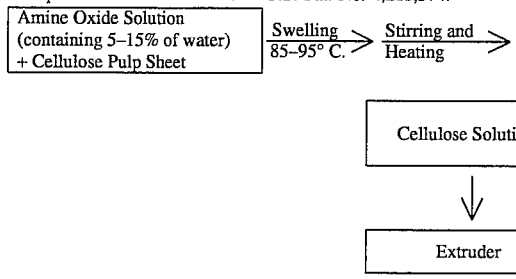

The cellulose solution obtained from the above prior art processes is highly viscous and is in a phase where the cellulose has been dissolved completely. Solidification of the solution takes several hours to several days. Thus, it is very difficult to convert the cellulose solution to chips. Moreover, even if the solution is converted into chips, decomposition of the cellulose and discoloration of the solution may occur during the additional dissolution steps which are carried out in an extruder to spin the solution. Thus, the solution must be transferred directly into an extruder in a liquid phase without any chipping steps. Otherwise it takes a long period of time to make chips.

As mentioned-above, the inventors of the present invention have extensively investigated the foregoing conventional processes for producing a cellulose solution in order to provide an practical process capable of forming a cellulosic article. As a result, the inventors have discovered that the above problems can be eliminated by milling and blending cellulose with a solid tertiary amine oxide (powder) having a specific content of water to provide pelletized pre-dope granules, wherein the tertiary amine oxide is homogeneously dispersed throughout the cellulose, followed by heating the pre-dope granules in the barrel of an extruder to dissolve the cellulose, extruding the resulting dope solution to provide an extrudate adapted to be spun, and spinning the extrudate through a spinnerette or die. The present invention has been completed based on this discovery.

SUMMARY OF THE INVENTION

It is therefore an object of the present invention to provide process for producing pelletized pre-dope granules of cellulose and tertiary amine oxide powder. It is another object of the invention is to provide pelletized pre-dope granules produced by the process.

It is still another object of the invention to provide a dope solution of cellulose adapted for spinning after the granules are transferred to an extruder without any chipping steps.

It is another object of the invention to provide a process for making shaped cellulosic articles such as fibers and films from a dope solution of cellulose.

These and other objects of the invention can be accomplished by a process for producing pelletized pre-dope granules of cellulose and a tertiary amine oxide uniformly dispersed throughout therein, which comprises the steps of feeding cellulose to a mill equipped with knife-edged blades, together with the tertiary amine oxide powder having a water content of 5 to 17% by weight; and milling and blending the solid mixture in the mill, while heating the solid mixture at a temperature sufficient to agglomerate as a result of instantaneous melting of tertiary amine oxide powder and simultaneous penetration of the molten amine oxide into cellulose without dissolving the cellulose. The temperature is thus below the melting temperature of the tertiary amine oxide powder so as to be in inter-diffusion without cellulose dissolution. The pre-dope granules are a solid complex of the cellulose which has not dissolved in the amine oxide.

BRIEF DESCRIPTION OF THE DRAWINGS

The present invention will be further described by the accompanying drawings, wherein.

DETAILED DESCRIPTION OF THE INVENTION

Figure 1:
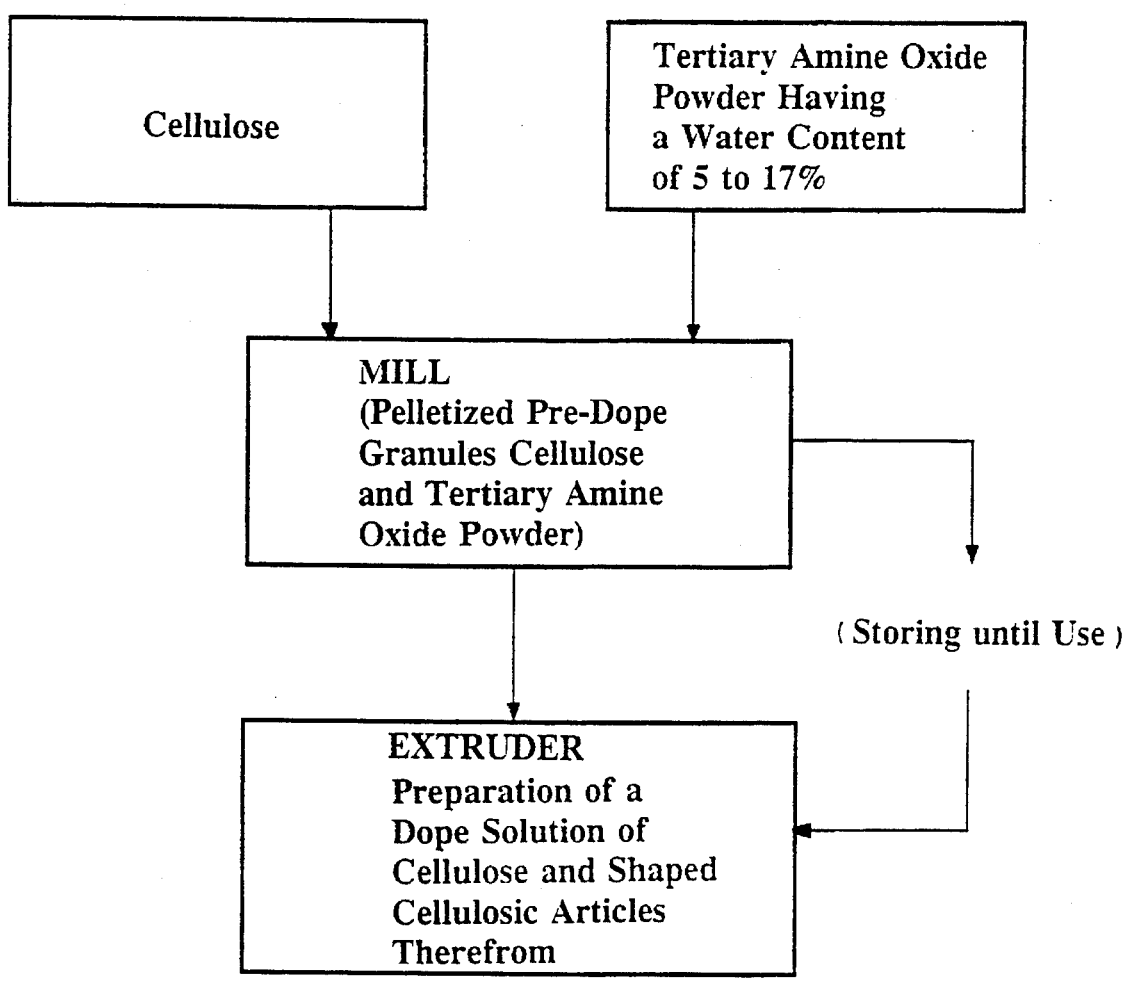
FIG. 1 is a block schematic diagram showing the procedure of a process for producing a solution of cellulose according to the present invention.

According to one embodiment of the invention, a process for making pelletized pre-dope granules of cellulose and a tertiary amine oxide dispersed throughout therein is provided. The process according to the invention comprises the steps of:

(a) feeding cellulose to a mill, together with the tertiary amine oxide powder having a water content of from 5 to 17% by weight; and (b) milling and blending the resulting solid mixture in the mill, while heating the mixture at a temperature sufficient to melt instantaneously tertiary amine oxide powder and simultaneously penetrate the molten amine oxide into cellulose without dissolving the cellulose.

In the process of the present invention, the tertiary amine oxide powder having a specific water content is homogeneously dispersed throughout the cellulose by mixing these components in a mill. This is accomplished by using tertiary amine oxide powder having a water content of 5 to 17% by weight and heating the amine powder at a temperature sufficient to agglomerate as a result of instantaneous melting of tertiary amine oxide powder and simultaneous penetration of the molten amine oxide into cellulose without dissolving the cellulose.

The pelletized pre-dope granules thus obtained are stored such that they do not come in contact with moisture until they are shaped into a cellulosic article such as a fiber or a film. When needed, the pelletized pre-dope granules may be fed to an extruder to form a dope solution of cellulose for spinning.

Preferably, the tertiary amine oxide powders used in carrying out the invention may be N-methylmorpholine-N-oxide, N-methylpyrrolidine-N-oxide, N-methylpiperidine-N-oxide, N-methylhexamethyleneimine-N-oxide, N,N-dimethylethanolamine-N-oxide, N,N-dimethylbenzylamine-N-oxide, N,N-dimethylcyclohexylamine-N-oxide; and N,N,N-triethylamine-N-oxide powder or mixtures thereof. Generally, the amount of cellulose to be fed to the mill is below 45% by weight, preferably 6 to 45% by weight, based on the total weight of a mixture of the cellulose and the tertiary amine oxide.

The temperature is controlled by adjusting friction heat and cooling water. Milling time should also be controlled to achieve the desired results as explained herein. The preferred heating temperature range in the mill depends on the cellulose content, but typically is 40° to 100° C. The blending may be carried out at any revolution speed of the knife-edged blades of the mill, provided that the tertiary amine oxide is homogeneously dispersed throughout the cellulose to give the pre-dope granules. Blending at 50 to 10,000 rpm has produced the desired results.

Since the tertiary amine oxide has been dispersed throughout the fibrils of the cellulose in the pre-dope granules according to the invention, the pre-dope granules can form a dope solution of cellulose for spinning through complete dissolution of the cellulose within a short time period during their passing through an extruder equipped with a conventional exhaust vent. In accordance with the conventional processes, either a solution of cellulose or solid chips of the solution wherein cellulose is completely dissolved in an amine oxide is transferred directly to an extruder. By contrast, according to the present process (as is described with reference to the accompanying drawings hereinafter), the pelletized pre-dope granules consisting of cellulose and an amine oxide, wherein the amine oxide is melted instantaneously and simultaneously penetrate into cellulose, may be transferred directly from a mill at a predetermined temperature to an extruder. Thus, the process of the present invention is quite different from the conventional processes.

The process of the present invention has the following important advantages:

First, the mechanical properties of fibers and films are improved by minimizing the time for dissolving a large amount of cellulose into a tertiary amine oxide to prevent the decomposition of both the cellulose and the tertiary amine oxide and the discoloration of the resulting solution. The dope solution of cellulose produced by the process of the invention is not discolored by thermal decomposition to any great extent compared to the discoloration results from the conventional processes. Further, the molecular weight of the cellulose in the solution is maintained without substantial change. As a result, there is no need to use an antioxidant such as propyl gallate in order to maintain the molecular weight of the cellulose.

Second, since the pre-dope granules may be transferred directly into an extruder, there is no need to prepare solid chips. The pre-dope granules can also be used in conventional extruders.

Finally, a dope solution of cellulose with a high solid content can be easily obtained. Preparation of a cellulose solution having a high solid content by the conventional processes requires severe conditions, such as a high temperature, an extended time period, vigorous stirring, and so forth, which degrade the cellulose. However, according to the present invention, the use of blending in a solid/solid phase does not require such severe conditions. Also, in the process of the present invention, even if the cellulose content is high (up to 45% by weight), the pre-dope granules are completely melted within a short time period during their passing through an extruder.

The invention will be described in greater detail with reference to the accompanying drawings.

FIG. 1 is a diagrammatic illustration of a process for producing pelletized pre-dope granules of cellulose and a tertiary amine oxide powder. According to this process, the cellulose is fed to a mill, together with the tertiary amine oxide powder having a water content of 5 to 17% by weight. The resulting solid mixture is milled and blended to form pre-dope granules. The pre-dope granules thus obtained are then melted in an extruder to form a dope solution of cellulose for spinning, and the resulting dope solution is extruded through a spinnerette or die.

Figure 2:
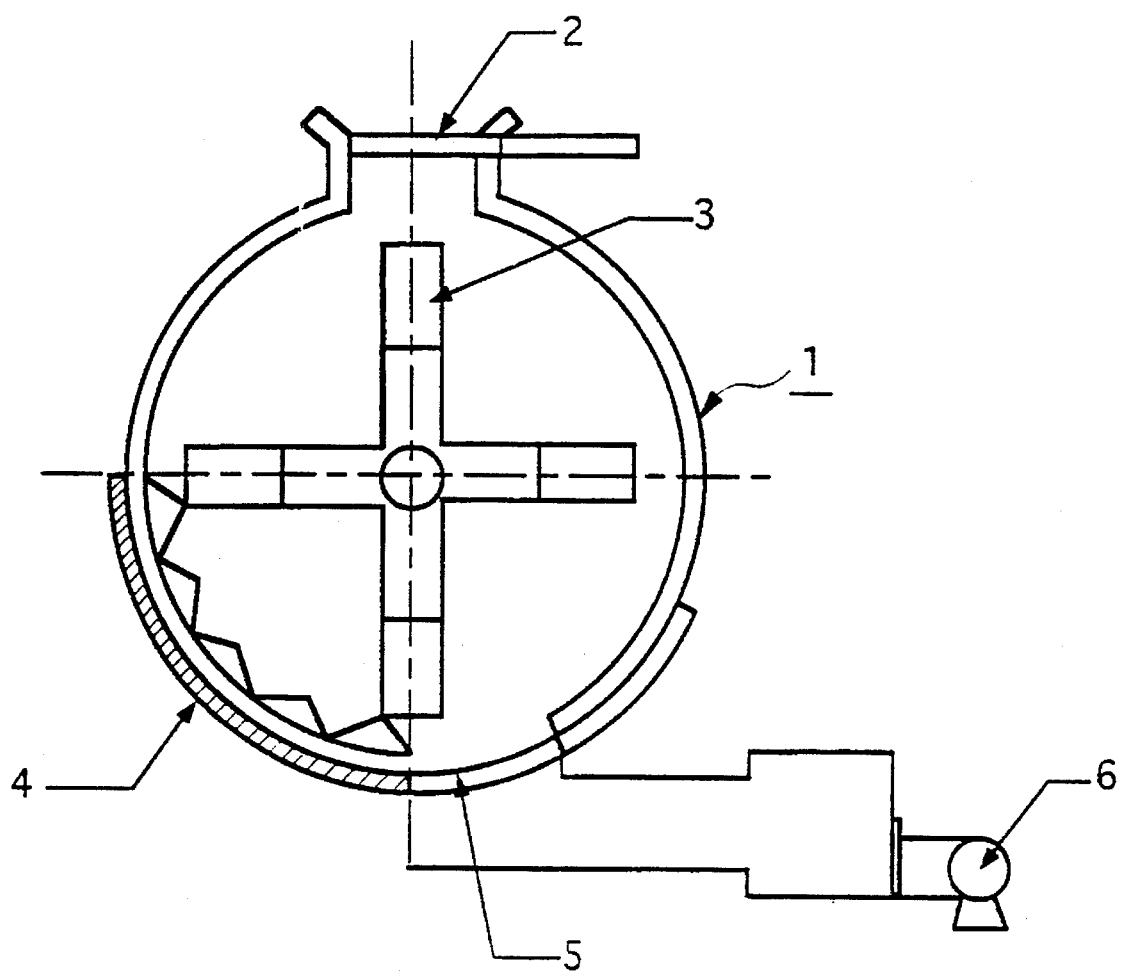
FIG. 2 shows the structure of a mill equipped with knife-edged blades for milling with tertiary amine oxide powder.

FIG. 2 shows schematically the process illustrated in FIG. 1 and the structure of an apparatus for carrying out the process. The cellulose is cut into a sheet or cotton linter in an equivalent size by means of a cutting machine, and introduced into the mill 1, together with the tertiary amine oxide powder having a water content of 5 to 17% by weight, through an inlet 2. The amount of the cellulose to be fed is up to 45% by weight, preferably from 6 to 45% by weight. The resulting solid mixture is homogeneously milled by means of a knife-edged blades 3 at 50 to 10,000 rpm. At this time, the temperature of heater 4 installed on the outward wall of the mill 1 is maintained at 40° to 100° C.

During the steps of milling and blending, the tertiary amine oxide powder is homogeneously dispersed throughout the cellulose. Also, since the tertiary amine oxide powder is melted to penetrate into the undissolved cellulose fibrils, homogeneously mixed granules, i.e. pelletized pre-dope granules, consisting of the cellulose and the tertiary amine oxide powder can be obtained.

The pre-dope granules are removed from the mill 1 by an inhalator 6 through an inhalation inlet 5. The resulting pre-dope granules are stored with a wrappage so as not to come in contact with moisture. Alternatively, a cellulose solution for spinning can be continuously prepared by connecting the mill 1 as illustrated in FIG. 2 directly to a hopper of an extruder.

Figure 3A:
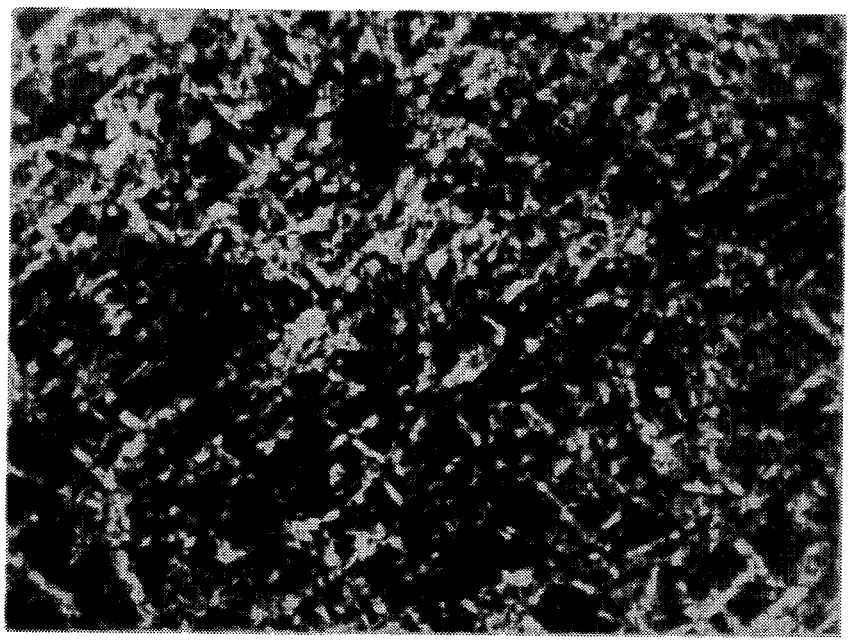
FIG. 3(A) is a microscopic photograph of a pre-dope granule of cellulose and a tertiary amine oxide.
Figure 3B:
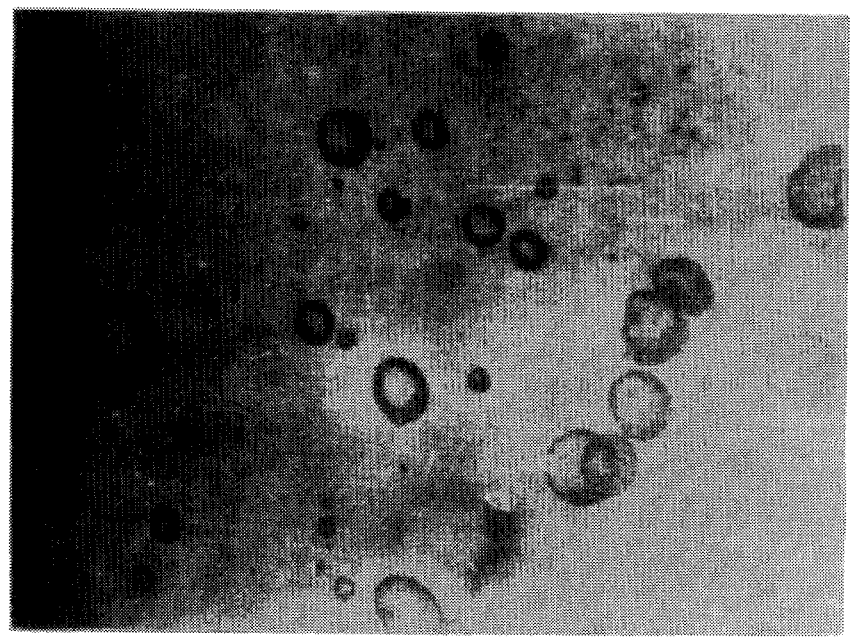
FIG. 3(B) is a microscopic photograph of a dope solution of cellulose which is produced by passing the pelletized pre-dope granule through an extruder.

FIG. 3 (A) is a photomicrograph of the pre-dope granules produced in the mill 1, as obtained through a microscope where a polarimeter is installed. FIG. 3 (B) is a photomicrograph of a dope solution of cellulose produced by passing the pelletized pre-dope granules through an extruder at a predetermined temperature.

When the pre-dope granules are observed with a microscope equipped with a polarimeter, the cellulose fibrils are found undissolved. However, because the tertiary amine oxide powder is homogeneously dispersed throughout the cellulose fibrils, particles thereof are not be observed in the pre-dope granules. In order to melt the pre-dope granules, they are passed through a single screw extruder equipped with an exhaust vent, which has a diameter of 25 mm and an L/D ratio of 20. The dope solution thus obtained can be observed through a microscope to determine whether the cellulose has been completely melted or not.

The present invention will be described in greater detail by way of the following examples, which are not limiting as to the invention.

EXAMPLE 1

As shown in FIG. 2, 85% by weight of N-methylmorpholine-N-oxide (NMMO) granules containing 12.5% by weight of water were introduced into a mill, and 15% by weight of cellulose pulp sheets (Rayonex-P) having a size of 5 cm×5 cm and a weight average polymerization degree ($DP_w$) of 900 were added thereto. The inner wall of the mill was maintained at 50° C. by means of the heater 4, and then the resulting mixture was blended at 250 rpm at that same temperature to form pelletized pre-dope granules.

The resulting pre-dope granules were introduced into a single screw extruder equipped with an exhaust vent, having a diameter of 25 mm and an L/D ratio of 20. After adjusting the temperature of the die region of the extruder to 90° C., dope solutions were prepared under the processing conditions as shown in Table 1 below. A portion of the resulting solution was investigated for the melting of the cellulose and the degree of discoloration of the resulting solution by microscope. At that time, the temperatures of the solid phase moving region, the dissolution region, and the liquid phase moving region in the extruder were set to 50° C., 90° C., and 100° C., respectively. The degree of dissolution is shown in Table 1 below.

The pre-dope granules not passed through the extruder were observed in the same manner as described above. The results confirmed that the cellulose remained undissolved in the mixture and that the amine oxide particles were not observed because they had been penetrated into the cellulose. In addition, it was observed that the pre-dope granules passed through the extruder were in a liquid phase wherein the cellulose had been completely dissolved.

The dope solution thus obtained was soaked in water to remove the solvent completely. About 3 g of the residue was dried in a vacuum drier for an hour, and then the molecular weight of the cellulose was calculated by measuring its inherent viscosity using a 0.5M cuene solution. It was found that the molecular weight had been reduced less than in a conventional solution.

TABLE 1

| Revolution of extruder (rpm) | Resident time of pre-dope granules (sec) | Amount of solution to be extruded (g/hr) | $DP_w$ of precipitated cellulose | Solution | |
|---|---|---|---|---|---|
| | | | | Cellulose fibril | Color |
| 5 | 567 | 590 | 650 | not observed | clear, pale brown |
| 10 | 255 | 914 | 655 | not observed | clear, pale brown |
| 20 | 123 | 1495 | 719 | not observed | clear, pale brown |
| 30 | 76 | 2060 | 820 | not observed | clear, pale brown |
| 50 | 53 | 3000 | 870 | not observed | clear, pale brown |

EXAMPLE 2

This example was carried out under the same conditions as described in Example 1 to give a dope solution of cellulose, except that the temperatures of the die, the solid phase moving region, the dissolution region, and a liquid phase moving region of in the extruder were changed to 110° C., 50° C., 110° C., and 110° C. respectively.

The resulting dope solution was extruded into a coagulant (distilled water) at 0.6 g/minute through an extruder equipped with a metering pump and a spinnerette (aperture size of 0.5 mm, L/D=2, 1 hole) and then wound at 100 m/minute, and 200 m/minute, respectively. The fibers thus coagulated were washed with water, dried, and then their mechanical properties were checked. The results are shown in Table 2 below.

TABLE 2

| Revolution of extruder (rpm) | Resident time of pre-dope granules (sec) | Amount of solution to be extrudated (g/hr) | $DP_w$ of precipitated cellulose | Solution | |
|---|---|---|---|---|---|
| | | | | Cellulose fibril | Color |
| 5 | 460 | 624 | 600 | not observed | clear, brown |
| 10 | 214 | 1004 | 620 | not observed | clear, brown |
| 20 | 93 | 1527 | 700 | not observed | clear, brown |
| 30 | 57 | 2200 | 800 | not observed | clear, pale brown |
| 50 | 43 | 3120 | 850 | not observed | clear, pale brown |

| Mechanical properties of fibers | | | |
|---|---|---|---|
| Withdrawal rate (m/min) | Tensile strength (g/d) | Initial modulus (g/d) | Strain (%) |
| 100 | 4.60 | 160 | 13.8 |
| 200 | 4.85 | 250 | 11.2 |

As can be seen from Table 2, no cellulose fibrils were observed in the solution under the processing conditions. However, the color of the solution was gradually changed into brown due to the decomposition of the solution with an increase in the temperature and the resident time of the pre-dope granules in the extruder.

EXAMPLE 3

75% by weight of N-methylmorpholine-N-oxide powder containing 10% by weight of water were introduced into the mill 1 as shown in FIG. 2. 25% by weight of cellulose pulp sheets (Cellunier F) was added thereto. The inner wall of the mill was maintained at 60° C. by means of the heater 4, and the mixture was blended at 4,000 rpm at that temperature to form pelletized pre-dope granules. The resulting granules were treated under that conditions as described in Example 2 to produce a dope solution of cellulose. No cellulose fibrils were observed in the solution. The dope solution thus obtained was extruded into a coagulant (containing about 20% by weight of N-methylmorpholine-N-oxide) in water at 0.2 g/minute through an extruder fitted with a metering pump and a spinnerette (aperture size of 0.25 mm, L/D=5, 24 hole), by the same procedures as described in Example 2. The fibers thus formed were wound at 100 m/minute. The coagulated fibers were washed with water, dried, and the mechanical properties thereof were checked. The results are shown in Table 3 below.

TABLE 3

| | Mechanical properties of fibers | | |
|---|---|---|---|
| Cellulose | Tensile strength (g/d) | Initial modulus (g/d) | Strain (%) |
| Cellunier F | 3.80 | 200 | 7.5 |
| Baker #1528.1 | 3.5 | 180 | 8 |

EXAMPLE 4

Into the mill 1 as shown in FIG. 2, 80% by weight of N-methylmorpholine-N-oxide powders containing 10% by weight of water were introduced, and 20% by weight of Cotton Pulp ($DP_w$ 600) was added thereto. The inner wall of the mill was maintained at 60° C., and the mixture was blended at 4,000 rpm at that temperature to form pelletized pre-dope granules. The resulting granules were treated under the same conditions as described in Example 2 to give a dope solution of cellulose, except that the temperature of the die region in the extruder was changed to 120° C. No cellulose fibrils were observed in the solution.

The dope solution thus obtained was extruded into a coagulant (containing about 20% by weight of N-methylmorpholine-N-oxide) in water at 0.15 g/minute through an extruder fitted with a metering pump and a spinnerette (aperture size of 0.25 mm, L/D=3, 24 hole), by the same process as described in Example 2. The fibers thus obtained wound at 100 m/minute. The coagulated fibers were washed with water, dried, and the mechanical properties thereof were checked. The results are shown in Table 4 below.

TABLE 4

| Revolution of extruder (rpm) | Resident time of pre-dope granules (sec) | Amount of solution to be extrudated (g/hr) | $DP_w$ of precipitated cellulose | Solution | |
|---|---|---|---|---|---|
| | | | | Cellulose fibril | Color |
| 5 | 360 | 710 | 410 | not observed | brown |
| 10 | 183 | 1124 | 480 | not observed | yellow |
| 20 | 73 | 1637 | 540 | not observed | pale yellow |
| 30 | 49 | 2400 | 565 | not observed | discolored |
| 50 | 33 | 3343 | 580 | not observed | discolored |

| | Mechanical properties of fibers | | |
|---|---|---|---|
| Cellulose | Tensile strength (g/d), dry | Initial modulus (g/d) | Strain (%) |
| Cotton linter | 6.85 | 254 | 9.5 |

EXAMPLE 5

65% by weight of N-methylmorpholine-N-oxide powders containing 6% by weight of water were introduced into the mill 1 as shown in FIG. 2. 35% by weight of cellulose pulp sheets ($DP_w$ 200) was added thereto. The inner wall of the mill was maintained at 80° C., and the mixture was blended at 5,000 rpm at that temperature to form pelletized pre-dope granules. The resulting granules were treated under the same conditions as described in Example 1 to give a dope solution of cellulose.

A small quantity of the cellulose fibrils were observed in the cellulose solution after passing through the extruder at 30 rpm and 50 rpm, respectively. However, the fibrils were easily removed with a filter.

EXAMPLE 6

N-methylmorpholine-N-oxide powder containing 9% by weight of water, N,N-dimethylethanolamine-N-oxide powder containing 8% by weight of water, and the other tertiary amine oxide powder listed in Table 5 below containing 7% by weight of water, was introduced into the mill 1 maintained at 60° C. together with 10% by weight of cellulose pulp sheets (Cellunier Q) to form pelletized pre-dope granules. The resulting pelletized pre-dope granules were treated under that conditions as described in Example 1, except that the temperature of the die in the extruder and the revolution speed of screw were changed to 100° C. and 20 rpm.

No cellulose fibrils were observed in the cellulose solution after passing through the extruder. The results are shown in Table 5 below.

TABLE 5

| Tertiary amine oxide | Resident time of pre-dope granules (sec) | Amount of solution to be extrudated (g/hr) | $DP_w$ of precipitated cellulose | Solution | |
|---|---|---|---|---|---|
| | | | | Cellulose fibril | Color |
| N,N-dimethylcyclohexylamine-N-oxide | 107 | 1540 | 750 | not observed | clear, pale brown |
| N,N-dimethylethanolamine-N-oxide | 104 | 1610 | 620 | not observed | clear, pale, brown |
| N-methylpyrrolidine-N-oxide | 111 | 1480 | 720 | not observed | clear, pale brown |
| N,N-dimethylbenzylamine-N-oxide | 112 | 1430 | 714 | not observed | clear, pale brown |
| N-methylpiperidine-N-oxide | 106 | 1570 | 750 | not observed | clear, pale brown |

What is claimed is:

1. A process for making pelletized pre-dope granules of cellulose and a tertiary amine oxide powder dispersed throughout therein, which comprises the steps of:

(a) feeding cellulose to a mill together with the tertiary amine oxide powder having a water content of 5 to 17% by weight; and (b) milling and blending the resulting solid mixture in the mill, while heating the solid mixture at a temperature sufficient to agglomerate as a result of instantaneous melting of tertiary amine oxide powder and simultaneous penetration of the molten amine oxide into cellulose without dissolving the cellulose.

2. The process according to claim 1, wherein the tertiary amine oxide powder is selected from the group consisting of N-methylmorpholine-N-oxide, N-methylpyrrolidine-N-oxide, N-methylpiperidine-N-oxide, N-methylhexamethyleneimine-N-oxide, N,N-dimethylethanolamine-N-oxide, N,N-dimethylcyclohexylamine-N-oxide, and N,N,N-triethylamine-N-oxide powder or mixtures thereof.

3. The process according to claim 1, wherein the cellulose is used in an amount of 6–45% by weight based on the total weight of the cellulose and the a tertiary amine oxide.

4. Pelletized pre-dope granules of cellulose and a tertiary amine oxide produced by the process according to any one of claims 1 to 3.

5. A dope solution of cellulose for spinning produced by heating the pelletized pre-dope granules according to claim 4 at a temperature sufficient to melt the granules.

6. A process for making shaped articles such as fibers and films from cellulose, its derivatives, or a mixture thereof, which comprises extruding the dope solution according to claim 5 to provide an extrudate adapted to be spun, and spinning the extrudate through a die.

7. The dope solution of claim 5, wherein said heating is in the barrel of an extruder.

* * * * *